United States Patent
Rossi

[19]

[11] Patent Number: 6,107,763
[45] Date of Patent: Aug. 22, 2000

[54] CLOSED LOOP AND OPEN SYNCHRONIZATION OF THE PHASE SWITCHINGS IN DRIVING A DC MOTOR

[75] Inventor: Annamaria Rossi, Rho, Italy

[73] Assignee: STMicroelectronics S.r.l., Agrate Brianza, Italy

[21] Appl. No.: 09/156,189

[22] Filed: Sep. 17, 1998

[30] Foreign Application Priority Data

Oct. 8, 1997 [EP] European Pat. Off. ............. 97830501

[51] Int. Cl.$^7$ .................................................. H02K 23/00
[52] U.S. Cl. ................... 318/254; 318/601; 318/603; 318/810; 318/430; 388/812
[58] Field of Search ................... 318/254, 439, 318/138, 685, 696, 600–605, 807–811; 388/804, 805, 811–814, 828, 829, 831, 832, 912, 921

[56] References Cited

U.S. PATENT DOCUMENTS

| | | | |
|---|---|---|---|
| 4,648,026 | 3/1987 | Petrick | 318/685 X |
| 4,743,815 | 5/1988 | Gee et al. | |
| 5,151,642 | 9/1992 | Lombardi et al. | 318/779 |
| 5,207,520 | 5/1993 | Tanaka | 318/276 X |
| 5,223,772 | 6/1993 | Carobolante | |
| 5,225,759 | 7/1993 | Endo et al. | |
| 5,506,487 | 4/1996 | Young et al. | 318/811 |
| 5,517,095 | 5/1996 | Carobolante et al. | 318/254 |
| 5,717,537 | 2/1998 | Watanabe et al. | 318/603 X |
| 5,739,663 | 4/1998 | Brown | 318/701 |
| 5,767,654 | 6/1998 | Menegoli et al. | 318/811 |
| 5,841,604 | 11/1998 | Supino | 318/85 X |
| 5,920,175 | 7/1999 | Jones et al. | 318/701 |

FOREIGN PATENT DOCUMENTS

19524557 A1  1/1997  Germany.

*Primary Examiner*—Brian Sircus
*Attorney, Agent, or Firm*—Theodore E. Galanthay; Allen, Dyer, Doppelt, Milbrath & Gilchrist, P.A.

[57] ABSTRACT

The synchronizing circuit of a digital drive system of an electric motor is configured to function in a closed loop or in an open loop mode by adding a minimum number of elements to the normal scheme of a closed loop synchronizing circuit. In practice, by adding only one programmable register and a pair of two-input de-multiplexers, the system is able to automatically switch from one mode of operation to the other mode. The programmable open loop mode permits compensating for the phase angle between the current flowing through the windings and the drive voltage applied thereto, as in case of a voltage mode driving.

13 Claims, 2 Drawing Sheets

CLOSED LOOP AND OPEN SYNCHRONIZATION OF THE PHASE SWITCHINGS IN DRIVING A DC MOTOR

FIELD OF THE INVENTION

The present invention relates in general to techniques for driving an electronically switched electric motor. In particular, the invention relates to a synchronizing circuit for the phase switchings in an open loop or closed loop operating mode.

BACKGROUND OF THE INVENTION

Recently a new driving technique has been developed for motors electronically switched according to a preestablished profile. The profile is typically sinusoidal, and may be digitized and stored in a ROM memory in the form of an N number of samples. A driving current or voltage corresponding to such a predefined profile is forced into each respective phase winding of a motor in synchronism with the rotor's position. The position may be detected by way of dedicated sensors or, as generally done, by sensing the zero crossing instants of back-electromotive-forces induced on the phase windings of the motor.

Usually this synchronizing function is carried out by measuring the interval of time (period) between two successive zero crossings of the back-electromotive-force signals. A frequency multiplier (e.g. a clock signal divider) is used to drive the pointer of the digital sample of the predefined and stored profile, represented by the N digital samples stored in the ROM memory. This synchronizes the phase switchings with this instantaneous value of the period occurring between two successive zero crossings. An entirely digital driving system of this kind is described in the prior European patent application No. 96830295.0. Dedicated reconstruction systems of back-electromotive-force signals to synchronize the driving of sensorless motors are described in the prior European patent applications No. 96830440.2 and 97830353.5, assigned to the assignee of the present invention.

These entirely digital driving systems may be alternatively commanded to operate in a closed loop mode or in an open loop mode of the synchronization control. In the open loop mode the switching frequency may be imposed by writing into a dedicated register certain frequency data for driving the phase switching to correspond to N times the desired rotational speed. When the system is commanded to function again in a closed loop mode, for example, during accelerations or decelerations from a steady state speed, a command is sent to ensure that the synchronizing system uses for the successive phase switching the time period between a forced synchronization signal, that is, of a pseudo zero crossing, and the pulse of the first real zero crossing. The successive scanning periods will use the time interval between two successive real zero crossings according to a normal closed loop mode of synchronization.

The ability to switch from an open loop and a closed loop mode of operation is implemented in the known systems by way of relatively complex circuitry. Moreover, in systems functioning in a voltage mode it is necessary to employ special means for introducing a certain phase shift for compensating for the phase angle existing between the drive current flowing in the windings and the voltage applied thereto.

SUMMARY OF THE INVENTION

In view of the foregoing background, it is therefore an object of the present invention to provide a synchronizing circuit that is relatively simple and switchable from a closed loop mode to an open loop operating mode and vice-versa, in a reliable manner, by adding a relatively small number of elements to a normal closed loop synchronizing circuit.

Moreover, the circuit of the invention may, by adding only one programmable register, introduce a certain phase shift between the predefined driving waveform profile and the back-electromotive-force waveform induced in the phase windings, that is, with respect to the zero crossing instants of the back-electromotive-force to optimize torque characteristics and efficiency yield during closed loop functioning phases of the synchronization system.

The present invention is directed to a synchronizing circuit for phase switchings of a multiphase brushless motor according to a profile stored in a form of N number of digital samples, and being selectively switchable in an open loop or closed loop mode of operation. The synchronizing circuit preferably includes sensing means for sensing an instantaneous position of rotor of the motor and generating a synchronizing pulse responsive thereto, and a frequency multiplier for a master clock signal outputting a derived clock signal having a period divided by an N factor. A first resettable counter receives the derived clock signal, and a second resettable counter receives the master clock signal. A third resettable counter has an output for pointing one of the stored N number of digital samples.

The synchronizing circuit also includes a first register having a reset input and storing the output of the first resettable counter responsive to a synchronizing pulse from the sensing means received on the reset input. A comparator is provided for comparing the output of the first register with contents of the second resettable counter and generating a reset pulse for the second resettable counter when the compared information is equal and for generating an incrementing pulse for the third resettable counter. The synchronizing circuit also preferably comprises a programming register storing programmed data, and a multiplexer and a demultiplexer connected thereto for coupling the output of the programming register to the input of the first register as an alternative to the output of the first resettable counter.

A circuit is also provided which is enabled by a logic command for generating a forced synchronizing pulse responsive to receiving a pulse from the third resettable counter when the third resettable counter reaches a value N−1. The forced synchronizing pulse is for causing a loading of data from the programming register into the first register during open loop mode operation, causing a resetting of the first resettable counter, and causing a selecting of the multiplexer and demultiplexer.

BRIEF DESCRIPTION OF THE DRAWINGS

The architecture, the functioning and the advantages of the circuit of the invention will be better illustrated by referring to an embodiment shown in the annexed drawings, wherein.

DETAILED DESCRIPTION OF THE PREFERRED EMBODIMENTS

By referring to the figures, given a certain N number of samples representing the driving profile, the scanning frequency (fscan) of the profile defined by the sequence of the N digital samples stored in a ROM memory must be substantially synchronized with respect to the rotational speed of the motor in a manner that:

$$fscan = N * fc \text{ wherein } fc = \frac{RPM}{60} * P$$

where P is the number of poles of the motor, and RPM is the number of revolutions per minute.

Figure 1:
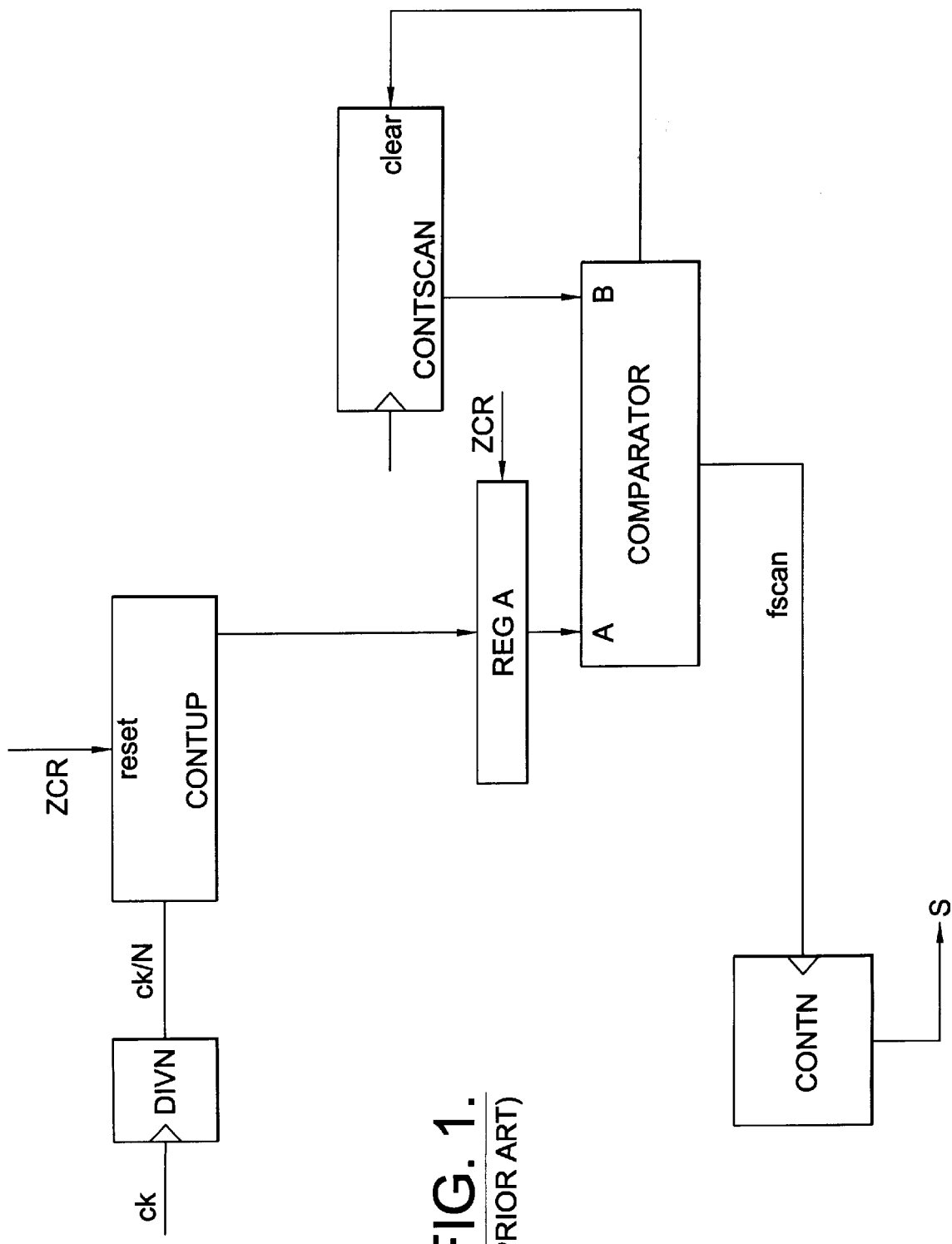
FIG. 1 shows the diagram of a common closed loop synchronizing circuit, according to the prior art.

FIG. 1 shows a digital driving system wherein there exists a system or master clock signal ck of a higher frequency than fscan, and a circuit with which the necessary frequency multiplication is provided to generate a pointer S. The pointer is for a certain digital sample of the driving profile stored in a dedicated memory in synchronism with a signal of zero crossing ZCR, continuously sensed by dedicated sensors or extracted from reconstructed the back-electromotive-force induced in the stator windings by the rotor's rotation, is shown in FIG. 1. The system's clock signal ck drives the counter CONTSCAN and, through a divider by N, DIVN, it drives the counter CONTUP.

Upon the incoming of a (zero-cross) ZCR synchronizing pulse, the register REG A stores the data contained in the counter CONTUP, which with the successive clock pulse ck resets itself and starts again the counting until the successive ZCR. The comparator compares the content of CONTSCAN, fed at the input B of the comparator, with the data contained in the register REG A fed to the input A of the comparator. When these two data are equal, the comparator resets the counter CONTSCAN via a CLEAR command and generates a phase switching pulse fscan. The fscan pulses increment the counter CONTN whose output data S represents the value of the pointer to the ROM memory where the N samples are stored.

Figure 2:
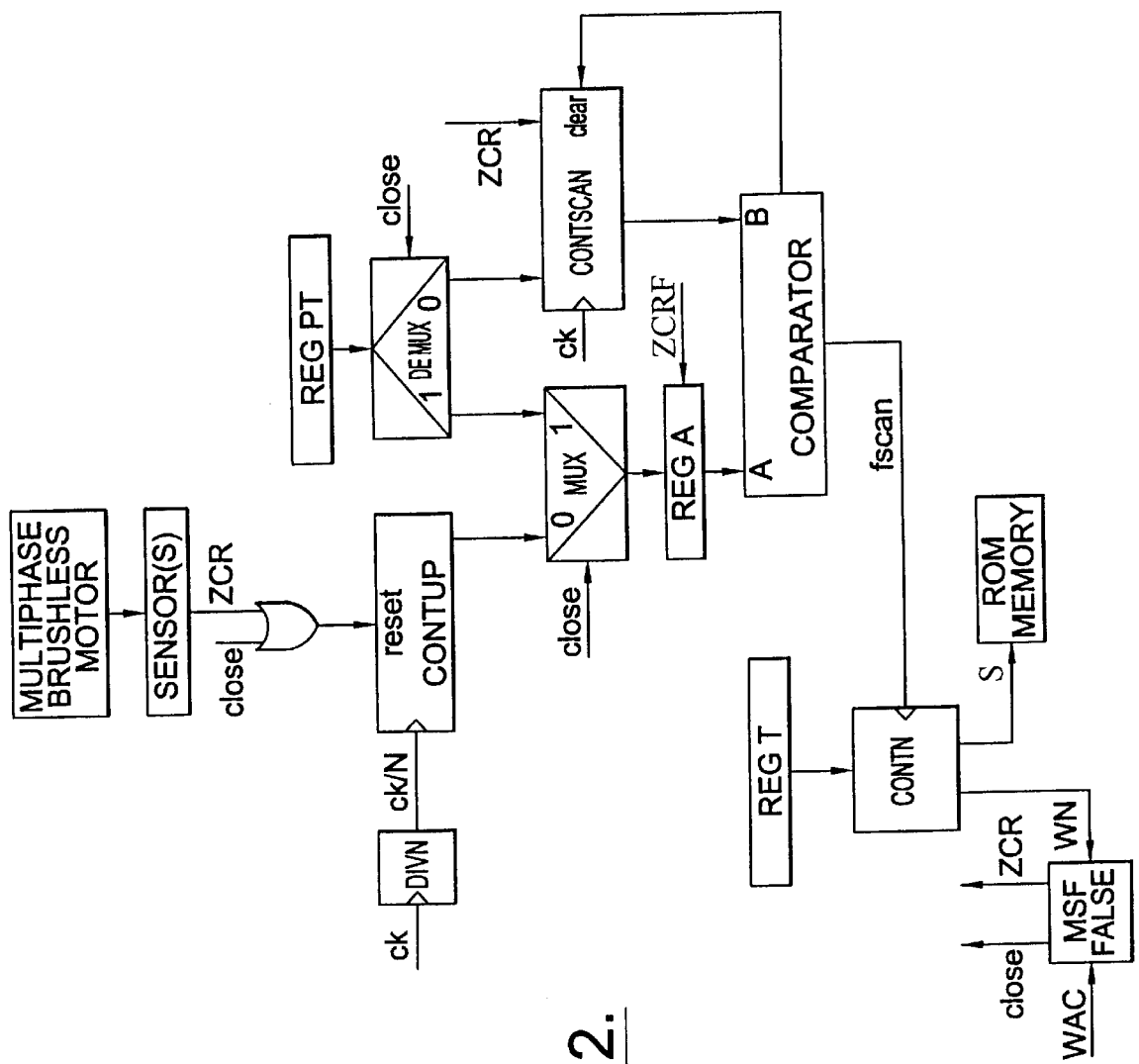
FIG. 2 shows the diagram of a synchronizing circuit of the invention according to a preferred embodiment.

To generate a pulse of forced synchronization for operating in an open loop mode, and to thus provide for the possibility of switching between the open loop and closed loop functioning modes, as well as to allow optionally the programming of a certain phase shift of the driving (phase switchings) with respect to the real synchronizing pulses when functioning in a closed loop mode and in a voltage mode, the basic synchronizing circuit depicted in FIG. 1 is modified, according to the present invention, as shown in FIG. 2.

Open Loop Mode Operation

When functioning in the open loop mode, a certain value of the frequency of scanning of the samples of the driving profile, predefined and permanently stored in the ROM memory, is programmable in the register REG FT. In these conditions of operation the signal CLOSE is at a certain logic value, for example "0", so as to reset the CONTUP counter which is used during closed loop operation. The demultiplexer from 1 to 2, (1*2) DEMUX, and the multiplexer from 2 to 1, (2*1) MUX, when the switching signal CLOSE=0, connect the output of the REG FT register to the input of the register REG A and therefore to the corresponding input A of the comparator. Therefore in this mode of operation, the comparator compares the content of the programming register REG FT with the output of the counter CONTSCAN generating the fscan pulses.

The counter CONTN advances at each fscan pulse, counting from 0 to N−1. Each time the counter N reaches N−1, it generates a signal WN which is fed to the circuit MSF FALSE.

The circuit MSF FALSE generates a forced synchronizing pulse ZCF that loads any new value programmed in the REG FT in the register REG A and so forth. Accordingly, during open loop functioning, the profiles are scanned in synchronism with the forced ZCF synchronizing pulses.

Switching From Open Loop to Closed Loop Mode

The switching of the driving system from an open loop to a closed loop mode of the operation of synchronization control may be commanded by a logic command WAC sent to the circuit MSF FALSE. At the instant the circuit MSF FALSE generates a new forced ZCF synchronizing pulse ZCF, if the logic command WAC is active, it sets the signal CLOSE to "1". This removes the reset from the counter CONTUP, which starts to count thereby measuring the interval of time between the forced ZCF synchronizing pulse and the next real ZCR synchronizing pulse. The signal CLOSE=1 also couples, via the DEMUX demultiplexer, the output of the programming register REG FT to the input of the CONTSCAN counter and, through the multiplier MUX, the output of CONTUP to the input of the REG A register and sets ZCRF=ZCR.

Closed Loop Mode Operation

Upon the incoming of a real synchronizing pulse ZCR, the content of the counter CONTUP is loaded in the register REG A. This generates the fscan pulses between two successive ZCR pulses, similarly to what illustrated in relation to the basic scheme of FIG. 1.

Programming of a Certain Phase Shift

The circuit of the invention lends itself also to the programming of a certain phase shift of the switchings of the winding of the motor in relation to the real synchronizing pulses ZCR. This becomes necessary or useful in the case of driving the windings of the motor in a voltage mode, for compensating for the phase difference between the driving voltage applied to their terminals and the current actually flowing through the windings (which generates the torque). This function may be easily implemented by simply adding a second programmable register REG T. A certain phase anticipation may be programmed by the use of the two registers REG T and REG FT.

A gross phase shift value is programmable in the REG T register, by which it is defined from which sample of the N samples that represent the preestablished profile stored in the ROM should start the counting of the counter CONTN, and with which it forms a "cyclic counter", resettable to T (that is, counting from T to N−1 to T−1). To this gross value of phase shift is added a dynamic phase shift value (fine) settable through the REG FT register. This determines the starting instant of the counter CONTSCAN within the phase interval of the Tth sample. Upon the incoming of a new real synchronizing pulse (ZCR), the counter CONTN is reset to a programmed value contained in the programming register REG FT.

The circuit of the invention allows for the implementation of these important functions with a minimum number of components. The precision of the system may be easily fixed by the parameters N and the sizes of the counters and of the registers employed.

Advantageously, the same programming register REG FT may be used for different functions during both open loop operation functioning and closed loop operation. In the latter case, programming register REG FT may be used for establishing in conjunction with the other programmable register REG T (specifically included added for this purpose), a high precision programmable phase shift.

That which is claimed is:

1. A synchronizing circuit for phase switchings of a multiphase brushless motor according to a profile stored in a form of N number of digital samples, and being selectively switchable to an open loop or closed loop mode of operation, comprising:

sensing means for sensing an instantaneous position of rotor of the motor and generating a synchronizing pulse responsive thereto;

a frequency divider for a master clock signal outputting a derived clock signal having a period divided by an N factor;

a first resettable counter receiving the derived clock signal;

a second resettable counter receiving the master clock signal;

a third resettable counter having an output for pointing to one of the stored N number of digital samples;

a first register having a reset input, the first register storing an output of said first resettable counter responsive to a synchronizing pulse from said sensing means received on the reset input;

a comparator comparing the output of said first register with contents of the second resettable counter and generating a reset pulse for said second resettable counter when the compared information is equal and for generating an incrementing pulse for the third resettable counter;

a programming register storing programmed data;

a demultiplexer for receiving an output from said programming register;

a multiplexer connected to said demultiplexer and said first resettable counter for selectively providing one of an output of said demultiplexer and an output of said first resettable counter to an input of said first register; and a forced synchronizing pulse generating circuit enabled by a logic command for generating a forced synchronizing pulse responsive to receiving a pulse from said third resettable counter when said third resettable counter reaches a value N−1, said forced synchronizing pulse for causing a loading of data from said programming register into said first register during open loop mode operation, causing a resetting of said first resettable counter, and causing said multiplexer to selectively provide one of the output of said demultiplexer and the output of said first resettable counter to the input of said first register.

2. A synchronizing circuit according to claim 1, further comprising a second programmable register having a phase shift value for resetting said third resettable counter to a certain value corresponding to a sample from the N number of digital samples from which said third resettable counter starts counting during closed loop mode operation, and for resetting the second resettable counter to a programmed value from said first programming register.

3. A synchronizing circuit for phase switchings of a multiphase brushless motor according to a profile stored in a form of N number of digital samples, and being selectively switchable in an open loop or closed loop mode of operation, comprising:

sensing means for sensing an instantaneous position of the rotor of the motor and generating a synchronizing pulse responsive thereto;

a first resettable counter;

a second resettable counter;

a third resettable counter having an output for pointing to one of the stored N number of digital samples;

a first register storing the output of said first resettable counter responsive to a synchronizing pulse from said sensing means;

a comparator comparing the output of said first register with contents of the second resettable counter and generating a reset pulse for said second resettable counter when the compared information is equal and for generating an incrementing pulse for the third resettable counter;

a programming register storing programmed data;

a demultiplexer for receiving an output from said programming register;

a multiplexer connected to said demultiplexer and said first resettable counter for selectively providing one of an output of said demultiplexer and an output of said first resettable counter to an input of said first register; and a forced synchronizing pulse generating circuit enabled by a logic command for generating a forced synchronizing pulse responsive to receiving a pulse from said third resettable counter when said third resettable counter reaches a value N−1.

4. A synchronizing circuit according to claim 3, wherein said circuit enabled by the logic command is operatively coupled so that said forced synchronizing pulse causes a loading of data from said programming register into said first register during open loop mode operation.

5. A synchronizing circuit according to claim 3, wherein said circuit enabled by the logic command is operatively coupled so that said forced synchronizing pulse causes a resetting of said first resettable counter.

6. A synchronizing circuit according to claim 3, wherein said circuit enabled by the logic command is operatively coupled so that said forced synchronizing pulse causes said multiplexer to selectively provide one of the output of said demultiplexer and the output of said first resettable counter to the input of said first register.

7. A synchronizing circuit according to claim 3, further comprising a frequency divider for a master clock signal outputting a derived clock signal having a period divided by an N factor.

8. A synchronizing circuit according to claim 7, wherein said first resettable counter receives the derived clock signal as an input; and wherein said second resettable counter receives the master clock signal as an input.

9. A synchronizing circuit according to claim 3, further comprising a second programmable register having a phase shift value for resetting said third resettable counter to a certain value corresponding to a sample from the N number of digital samples from which said third resettable counter starts counting during closed loop mode operation.

10. A synchronizing circuit according to claim 9, wherein said phase shift value of second programmable register is further for resetting the second resettable counter to a programmed value from said first programming register.

11. A synchronizing circuit for phase switchings of a multiphase brushless motor according to a profile stored in a form of N number of digital samples, and being selectively switchable in an open loop or closed loop mode of operation, comprising:

sensing means for sensing an instantaneous position of rotor of the motor and generating a synchronizing pulse responsive thereto;

a first resettable counter;

a second resettable counter;

a third resettable counter having an output for pointing to one of the stored N number of digital samples;

a first register having a reset input, said first register storing the output of said first resettable counter responsive to a synchronizing pulse from said sensing means received on the reset input;

a comparator for comparing the output of said first register with contents of the second resettable counter and generating a reset pulse for said second resettable counter when the compared information is equal and for generating an incrementing pulse for the third resettable counter;

a programming register storing programmed data;

a demultiplexer for receiving an output from said programming register;

a multiplexer connected to said demultiplexer and said first resettable counter for selectively providing one of an output of said demultiplexer and an output of said first resettable counter to an input of said first register;

a forced synchronizing pulse generating circuit enabled by a logic command for generating a forced synchronizing pulse responsive to receiving a pulse from said third resettable counter when said third resettable counter reaches a value N−1, said forced synchronizing pulse for causing a loading of data from said programming register into said first register during open loop mode operation, causing a resetting of said first resettable counter, and causing said multiplexer to selectively provide one of the output of said demultiplexer and the output of said first resettable counter to the input of said first register; and a second programming register having a phase shift value for resetting said third resettable counter to a certain value corresponding to a sample from the N number of digital samples from which said third resettable counter starts counting during operation in closed loop mode operation, and for resetting the second resettable counter to a programmed value in said first programming register.

12. A synchronizing circuit according to claim 11, further comprising a frequency divider for a master clock signal outputting a derived clock signal having a period divided by an N factor.

13. A synchronizing circuit according to claim 11, where in said first resettable counter receives the derived clock signal as an input; and wherein said second resettable counter receives the master clock signal as an input.

* * * * *

UNITED STATES PATENT AND TRADEMARK OFFICE
CERTIFICATE OF CORRECTION

PATENT NO. : 6,107,763
DATED : August 22, 2000
INVENTOR(S) : Annamaria Rossi

It is certified that error appears in the above-identified patent and that said Letters Patent is hereby corrected as shown below:

On the title page: Item [54] and Column 1, line 3,

In the title: Delete: "CLOSED LOOP AND OPEN SYNCHRONIZATION OF THE PHASE SWITCHINGS IN DRIVING A DC MOTOR"

Insert -- CLOSED LOOP AND OPEN LOOP SYNCHRONIZATION OF THE PHASE SWITCHINGS IN DRIVING A DC MOTOR --

Signed and Sealed this

Fifteenth Day of May, 2001

Attest:

NICHOLAS P. GODICI

Attesting Officer

Acting Director of the United States Patent and Trademark Office